(12) United States Patent
Bolourchi et al.

(10) Patent No.: US 9,051,005 B2
(45) Date of Patent: Jun. 9, 2015

(54) TORQUE-BASED ON-CENTER FEEL FOR ELECTRIC POWER STEERING

(75) Inventors: Farhad Bolourchi, Novi, MI (US); Ashok Chandy, Fenton, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 221 days.

(21) Appl. No.: 13/606,809

(22) Filed: Sep. 7, 2012

(65) Prior Publication Data

US 2013/0238193 A1 Sep. 12, 2013

Related U.S. Application Data

(60) Provisional application No. 61/532,949, filed on Sep. 9, 2011.

(51) Int. Cl.
*B62D 5/04* (2006.01)
(52) U.S. Cl.
CPC ............ *B62D 5/0466* (2013.01); *B62D 5/0463* (2013.01)
(58) Field of Classification Search
CPC ........................... B62D 5/0463; B62D 5/0466
USPC ........ 180/422, 443, 446; 318/606; 701/41, 42
See application file for complete search history.

(56) References Cited

U.S. PATENT DOCUMENTS

| 5,473,231 | A | * | 12/1995 | McLaughlin et al. | ........ | 180/446 |
| 5,704,446 | A | | 1/1998 | Chandy et al. | | |
| 2010/0286871 | A1 | * | 11/2010 | Kobayashi et al. | ............. | 701/41 |

OTHER PUBLICATIONS

Y. Oniwa, et al., Evaluation Method for Steer Assist Feeling Around Steering Center and Control Design on EPS, Journal of Mechanical Systems for Transportation and Logistics, vol. 1, No. 1, 2008, 11 pages.

* cited by examiner

*Primary Examiner* — John Q Nguyen
*Assistant Examiner* — Anshul Sood
(74) *Attorney, Agent, or Firm* — Cantor Colburn LLP

(57) ABSTRACT

A control system for controlling an electric power steering system is provided. The control system includes a first module configured to compute an on-center torque adjustment compensation based on a sensed handwheel torque. The on-center torque adjustment compensation is configured to compensate for inertia of a steering actuator motor using a frequency-based methodology. The control system also includes a second module configured to generate a command signal to control the steering actuator motor of the electric power steering system based on the on-center torque adjustment compensation.

17 Claims, 6 Drawing Sheets

TORQUE-BASED ON-CENTER FEEL FOR ELECTRIC POWER STEERING

CROSS-REFERENCE TO RELATED APPLICATIONS

This patent application claims priority to U.S. Provisional Patent Application Ser. No. 61/532,949, filed on Sep. 9, 2011, which is incorporated herein by reference in its entirety.

BACKGROUND OF THE INVENTION

The present invention relates to methods and systems for controlling a steering system, and more particularly to methods and system for controlling the on-center feel of an electric power steering system.

Vehicle steering systems are typically constructed such that when a driver does not apply steering torque to the steering wheel, and the vehicle is moving, the vehicle steering tends to return to the center, or straight line of travel, position. This return-to-center function is in response to road forces acting on the turned front tires of the moving vehicle that tend to force the turned tires to the neutral (center) position.

In electric power steering systems, a command may be generated that controls an electric power steering motor to provide a return-to-center position force. The force commanded to the motor overcomes the steering friction and allows the return-to-center function. Upon reaching an on-center position, electric power steering systems typically receive a near-zero torque assist command (similar to conventional manual steering systems), but inertia of the electric power steering motor and back electromotive force (EMF) must be overcome. This combination can result in a notable difference in driving feel between electric power steering systems and conventional manual steering systems.

Accordingly, it is desirable to provide control systems and methods that generate improved command signals for electric power steering motors to be like the manual steering system for near center steering position.

SUMMARY OF THE INVENTION

These and other advantages and features will become more apparent from the following description taken in conjunction with the drawings.

In one embodiment, a control system for controlling an electric power steering system is provided. The control system includes a first module configured to compute an on-center torque adjustment compensation based on a sensed handwheel torque. The on-center torque adjustment compensation is configured to compensate for inertia of a steering actuator motor using a frequency-based methodology. The control system also includes a second module configured to generate a command signal to control the steering actuator motor of the electric power steering system based on the on-center torque adjustment compensation.

In another embodiment, a method of controlling an electric power steering system is provided. The method includes computing an on-center torque adjustment compensation based on a sensed handwheel torque. The on-center torque adjustment compensation is configured to compensate for inertia of a steering actuator motor using a frequency-based methodology. A command signal is generated to control the steering actuator motor of the electric power steering system based on the on-center torque adjustment compensation.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
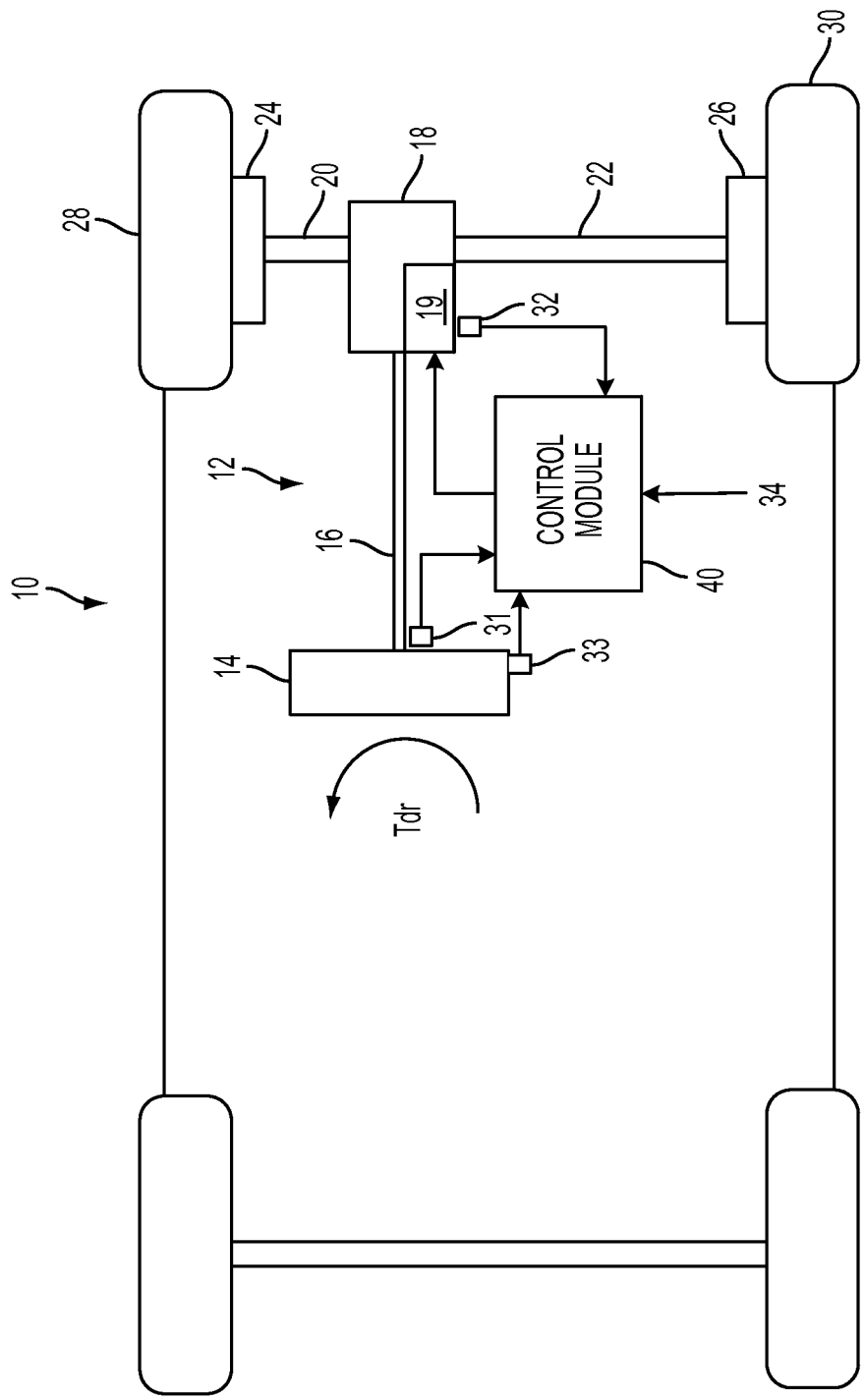
FIG. 1 is a functional block diagram illustrating a vehicle including a steering system in accordance with exemplary embodiments.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting the same, an exemplary embodiment of a vehicle 10 including a steering system 12 is illustrated. In various embodiments, the steering system 12 includes a handwheel 14 coupled to a steering shaft system 16 which includes steering column, intermediate shaft, & the necessary joints. In one exemplary embodiment, the steering system 12 is an electric power steering (EPS) system that further includes a steering assist unit 18 that couples to the steering shaft system 16 of the steering system 12 and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as the handwheel 14 is turned by a vehicle operator, the steering actuator motor 19 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque ($T_{dr}$) applied to the handwheel 14 by the operator of the vehicle 10. The torque sensor generates a driver torque signal based thereon. In another example, the sensor 32 is a motor speed sensor that senses a rotational speed of the steering actuator motor 19. The sensor 32 generates a motor speed or velocity signal based thereon. In yet another example, the sensor 33 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply an on-center torque adjustment compensation.

Figure 2:
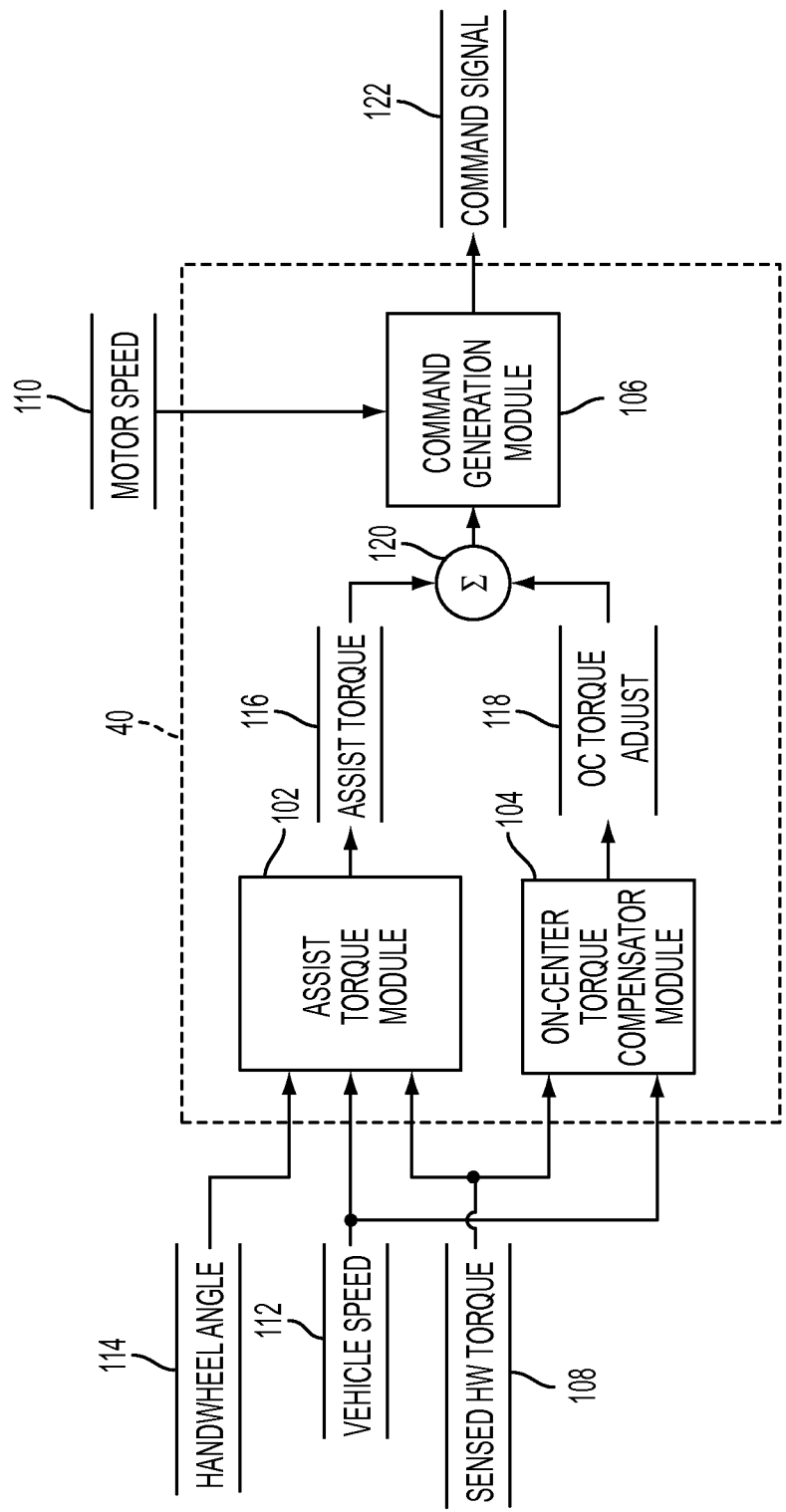
FIG. 2 is a dataflow diagram illustrating a steering control system in accordance with exemplary embodiments.

FIG. 2 depicts a dataflow diagram further illustrating the control module 40 of FIG. 1 in accordance with exemplary embodiments. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly generate the assist command signal to the steering system 12 of FIG. 1. Inputs to the control module 40 can be generated from the sensors 31, 32, 33 of FIG. 1 of the vehicle 10 of FIG. 1, can be received from other control modules (not shown) within the vehicle 10, can be modeled, and/or can be predefined.

The control module 40 includes an assist torque module 102, an on-center torque compensator module 104, and a command generation module 106. The control module 40 is configured to receive a sensed handwheel torque 108, a motor speed 110, a vehicle speed 112, and a handwheel angle 114. The sensed handwheel torque 108 is a sampled version of the signal received from sensor 31 of FIG. 1. The motor speed 110 is a sampled version of the signal received from sensor 32 of FIG. 1. The vehicle speed 112 is a sampled version of the vehicle speed signal 34 of FIG. 1. The handwheel angle 114 is a sampled version of the signal received from sensor 33 of FIG. 1.

The assist torque module 102 is configured to determine an assist torque 116 (primarily) for handwheel off-center conditions based on inputs to the assist torque module 102, such as the sensed handwheel torque 108, vehicle speed 112, and handwheel angle 114. To generate the assist torque 116, the assist torque module 102 may apply methods known in the art, such as those described in U.S. Pat. No. 5,704,446, issued to Chandy et al., and incorporated by reference in its entirety. For example, the assist torque module 102 can act as a low pass/all pass gain to establish a base level steering feel to a driver of the vehicle 10 of FIG. 1.

The on-center torque compensator module 104 is configured to receive the sensed handwheel torque 108 and may also receive the vehicle speed 112. The on-center torque compensator module 104 is configured to compute an on-center torque adjustment compensation 118 as further described herein.

The command generation module 106 receives a summation of the assist torque 116 and the on-center torque adjustment compensation 118 via summing junction 120 and in response thereto, generates a command signal 122 to control the steering actuator motor 19 of FIG. 1. Accordingly, the command signal 122 is based on both the assist torque 116 and the on-center torque adjustment compensation 118. For an on-center condition, where the assist torque 116 is substantially near zero, the on-center torque adjustment compensation 118 dominates torque-based generation of the command signal 122. In an embodiment, the command generation module 106 incorporates a speed feedback loop based on the motor speed 110. The command generation module 106 can apply methods known in the art to generate the command signal 122 for the steering actuator motor 19 of FIG. 1 from torque-based and speed-based input. For example, the command generation module 106 can apply a gain and/or filter to the motor speed 110 and apply a further gain to the summation of the assist torque 116 and the on-center torque adjustment compensation 118.

Figure 3:
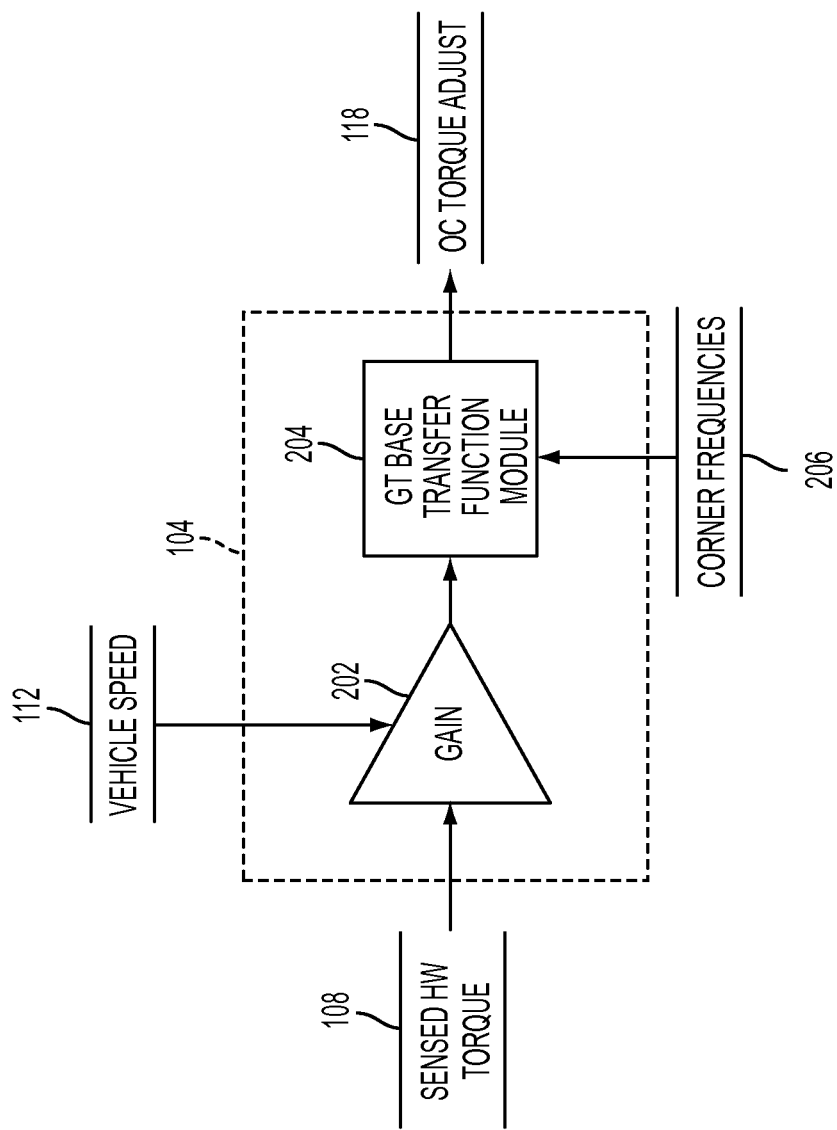
FIG. 3 is a dataflow diagram illustrating an on-center torque compensator module in accordance with exemplary embodiments.

FIG. 3 is a dataflow diagram illustrating the on-center torque compensator module 104 of FIG. 2 in accordance with exemplary embodiments. In exemplary embodiments, the on-center torque compensator module 104 includes a gain function 202 and a base transfer function 204. The gain function 202 and the base transfer function 204 are applied to the sensed handwheel torque 108 to compute the on-center torque adjustment compensation 118. The gain function 202 may be a constant value or a function based on, for example, one or more of the vehicle speed 112 and the sensed handwheel torque 108. The base transfer function 204 is configured to implement a multi-order transfer function for a plurality of corner frequencies 206. In an exemplary embodiment, the base transfer function 204 is characterized by an equation:

$$\frac{s^2 P_1 P_2}{(s+P_1)(s+P_2)} \quad (1)$$

Where s is a complex frequency, and $P_1$ and $P_2$ define the corner frequencies 206. Although specified as an s-domain transfer function, it will be understood that the base transfer function 204 can be implemented in a difference equation format that includes or keeps separate the gain function 202.

The $s^2$ term in eq. (1) guarantees that at zero frequency (i.e., DC) the on-center torque adjustment compensation 118 does not generate any torque, and therefore, the assist torque 116 will not need to be adjusted, if the OC torque adjust 118 is left running for the off-center positions too. This constant coexistence is highly desirable over the case where the OC torque adjust 118 is switched off during off-center as such on-off controls could pose new steering feel issues.

The on-center torque adjustment compensation 118 generated by the on-center torque compensator module 104 is configured to compensate for inertia of a steering actuator motor 19 of FIG. 1 using a frequency-based methodology. The on-center torque adjustment compensation 118 generated by the on-center torque compensator module 104 is further configured to compensate for torque measurement dynamics and sampling effects of the sensed handwheel torque 108. Additionally, the on-center torque adjustment compensation 118 generated by the on-center torque compensator module 104 is configured to compensate for torque measurement dynamics and sampling effects of the motor speed 110 of the steering actuator motor 19. Values for the gain function 202 and the corner frequencies 206 can be determined by modeling a difference between the input driver handwheel torque ($T_{dr}$) and the sensed handwheel torque 108 for an on-center condition of the handwheel 14 with the steering actuator motor 19 engaged versus the steering actuator motor 19 disengaged, as further described in reference to FIGS. 4-6.

Figure 4:
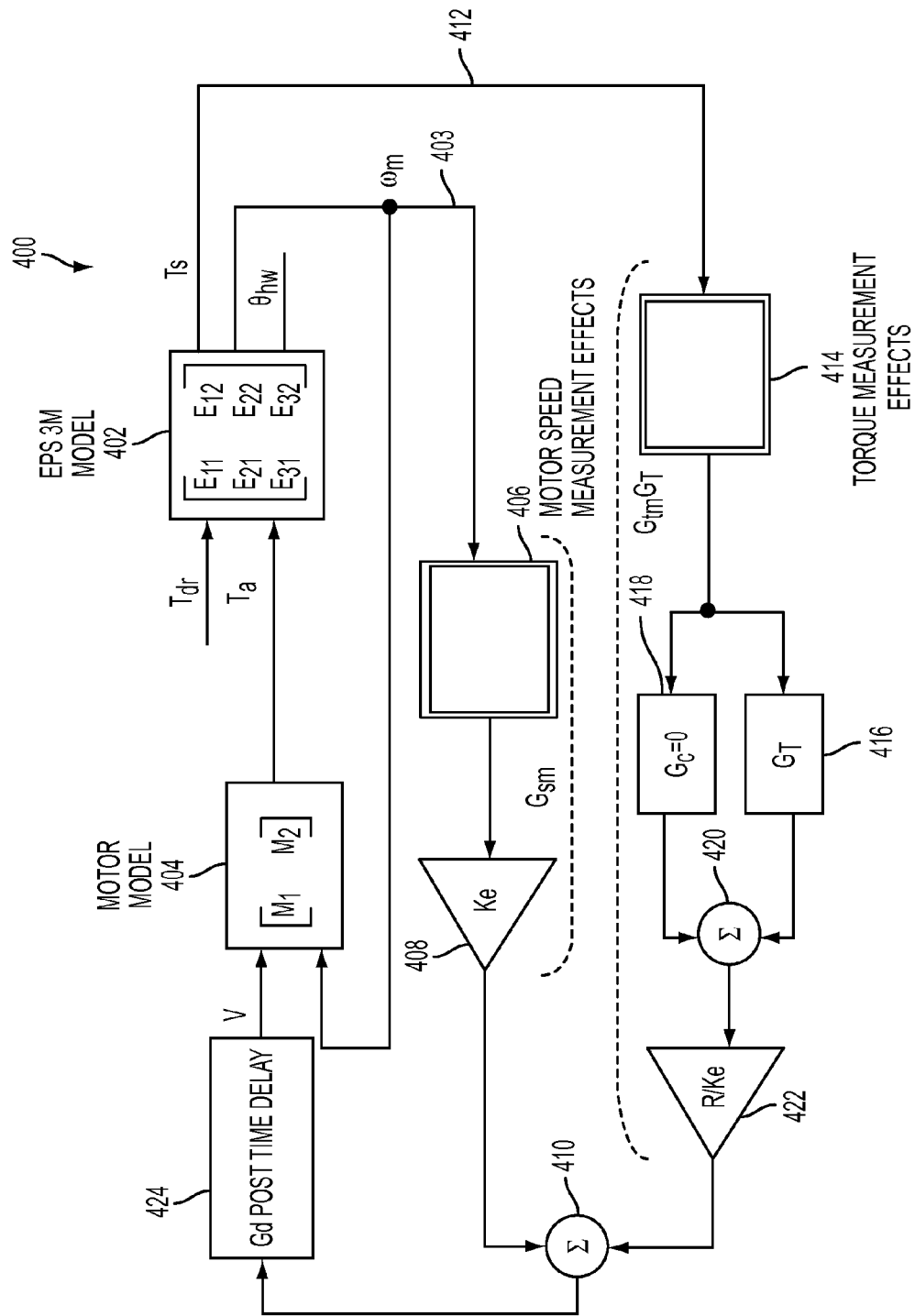
FIG. 4 is a dataflow diagram illustrating a torque-based steering control system model in accordance with exemplary embodiments.

FIG. 4 is a dataflow diagram illustrating a torque-based steering control system model 400 in accordance with exemplary embodiments. The torque-based steering control system model 400 is a model structure that can be used to generate a model torque based compensator for the on-center torque compensator module 104 of FIGS. 2 and 3 by solving for $G_T$ 416. In FIG. 4, six components (transfer functions: E11, E12, E21, E22, E31, E32) reside in an EPS 3-mass plant (3M) model 402. These components define the mechanical dynamics of the EPS system (which includes the steering actuator motor 19 of FIG. 1). In the computation of the model torque based compensator, complex frequency response vectors of these components may be used. These vectors can be computed at frequencies ranging from 0.1 Hz to 100 Hz in this example. The EPS 3M model 402 receives as input: a driver handwheel torque ($T_{dr}$) and a motor model torque ($T_a$). The EPS 3M model 402 applies the transfer functions E11 ... E32 to the inputs and generates as output: a sensed handwheel torque ($T_s$), a motor speed $\omega_m$, and a handwheel position $\theta_{hw}$.

The motor speed $\omega_m$ is an output of the EPS 3M model 402 that is used for electrical motor modeling in a speed path 403 of the torque-based steering control system model 400. The motor speed $\omega_m$ is also used as digital feedback to remove the back electromotive force effects of the motor in motor model 404. The handwheel position $\theta_{hm}$ is an output signal of the EPS 3M model 402 that could be used to shape a transfer function of $\theta_{hw}/T_s$. However, since an exact calculation of $G_T$ 416 is made by shaping a $T_s/T_{dr}$ transfer function toward a "manual steering" target, i.e., removing motor inertia, sensor measurement, and dynamic effects, the resulting $\theta_{hw}/T_s$ transfer function need not be determined, as the $\theta_{hw}/T_s$ transfer function will also be shaped toward its manual target as well. Consequently, a simpler design process results from not incorporating $\theta_{hw}$ in the calculation of $G_T$ 416.

A transfer function $G_{sm}$ models motor feedback in the speed path 403, incorporating motor speed measurement effects 406 that can include motor speed measurement dynamics and effects of sampling in the speed path 403. The modeled effects in 406 can account for timing uncertainty, transport delay, sensor and interface accuracy, and quantization errors, among other effects. The transfer function $G_{sm}$ also incorporates an estimated motor constant Ke 408.

Added to the output of transfer function Gsm at summing junction 410 is the product of $G_{tm}G_T$, where Gc 418 is set to zero to model the torque assist 116 of FIG. 2 for an on-center condition, and the effects of Gc 418 are added to the effects of $G_T$ 416 at summing junction 420 as depicted in FIG. 4. $G_{tm}$ in the torque path 412 represents torque sensor measurement dynamics as well the sampling effects 414 to model the sensed handwheel torque 108 of FIG. 2 based on $T_s$. The modeled effects in 414 can account for timing uncertainty, transport delay, sensor and interface accuracy, and quantization errors, among other effects. $G_{tm}$ is also a function of gain 422 as motor resistance R divided by the estimated motor constant Ke 408. Here, the motor resistance R and the estimated motor constant Ke 408 are assumed to be known for a given system. $G_d$ 424, representing the effects of post time delay in digital calculations, takes in a summed signal from the summing junction 410 and outputs a final motor voltage V. The motor voltage V is passed to the motor model 404 to close the loop in the torque-based steering control system model 400.

The motor model 404 includes component transfer functions M1 and M2, which represent the motor electrical model for the steering actuator motor 19 of FIG. 1. The motor model 404 incorporates a motor inductance effect, L, as a simple brush type characterization of the motor. It follows then from algebraic manipulations for the torque-based steering control system model 400 of FIG. 4 that a closed loop transfer function between $T_{dr}$ and $T_s$ can be written as:

$$TF_1 = \frac{T_s}{T_{dr}} = \frac{E_{11}C + BE_{21}}{AC - BD} \qquad (2)$$

Where E11 and E21 are transfer function components of the EPS 3M model 402 and where:

$$A = 1 - E_{12}M_1G_TG_mG_d$$

$$B = E_{12}M_1G_{sm}G_d + E_{12}M_2$$

$$C = 1 - E_{22}M_1G_{sm}G_d - E_{22}M_2$$

$$D = E_{22}M_1G_TG_{tm}G_d$$

Now setting TF1 to the target "manual" transfer function (T1 herein), $G_T$ can be calculated from equation (2) to be:

$$G_T = \frac{T_1C - E_{11}C - BE_{21}}{T_1M_1G_{tm}G_d(CE_{12} + BE_{22})} \qquad (3)$$

Note that since all the components in equation (3) are complex vectors, all of the mathematical operations are performed element-by-element.

Figure 5:
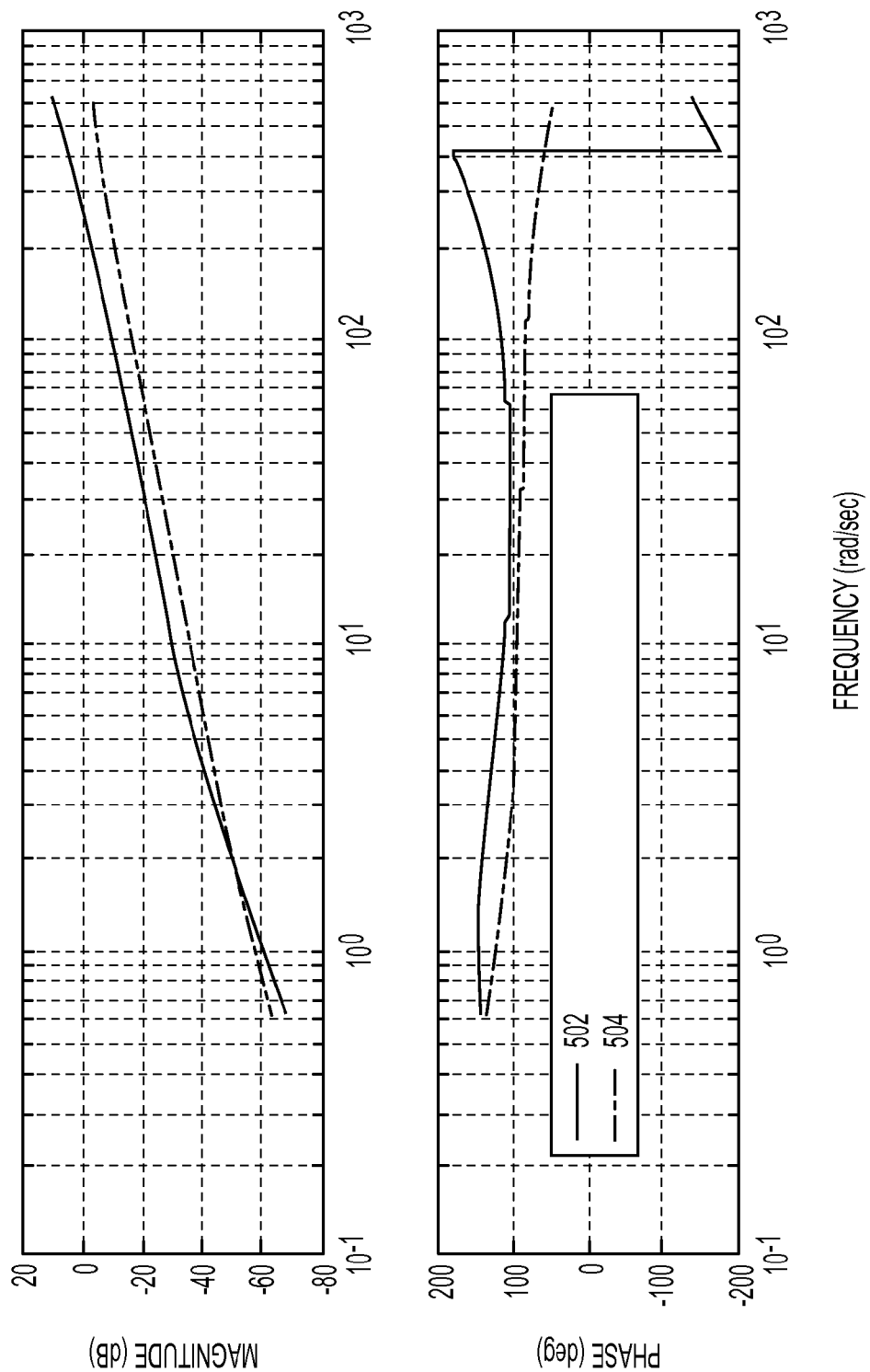
FIG. 5 is a bode plot illustrating a modeled torque-based compensator versus an on-center torque adjustment compensation of a steering control system in accordance with exemplary embodiments.

A realizable dynamic system that matches a bode plot, at least in the frequency range that $G_T$ was computed for (i.e., 0.1 to 100 Hz) is then determined In various embodiments, a second-order transfer function is used. FIG. 5 is a bode plot illustrating a modeled torque-based [e.g. eq(3)] compensator for $G_T$ 502 versus an on-center torque adjustment [e.g. eq(1)] compensation 504 of the on-center torque compensator module 104 of FIGS. 2 and 3. The frequency response of $G_T$ 502 of FIG. 5 starts with a 40 dB/decade slope and almost a 180 degree phase lead, both of which correspond to an $s^2$ term in a representative transfer function. Both the magnitude and the phase in the bode plot of FIG. 5 show a low pass filter to be present at low frequencies past DC followed by a high pass (or lead) action at very high frequencies. The high frequency lead action may not be required, and instead, a second high frequency lag filter can be cascaded in order to maintain proper order and guard against noise issues. Accordingly, an approximation for $G_T$ 502 shown as on-center torque adjustment compensation 504 is:

$$G_T = \frac{s^2}{400} \frac{0.1 * 2 * pi}{(s + 0.1 * 2 * pi)} \frac{100 * 2 * pi}{(s + 100 * 2 * pi)}. \qquad (4)$$

Note that in equation 4, the gain function 202 of FIG. 3 is a predetermined gain (1/400) and the corner frequencies 206 of FIG. 3 map to two low pass corner frequencies (0.1 Hz and 100 Hz) for the base transfer function 204 of FIG. 3. In exemplary embodiments, values of the gain function 202 and the corner frequencies 206 are adjusted such that a close match between the approximate and exact versions of $G_T$ is achieved. Comparing frequency responses using a frequency-based methodology helps to ensure that a close match is achieved over a frequency range of interest without performing more involved and iterative root-locus analysis.

As can be appreciated, other values can be used for the gain and the corner frequencies as shown as:

$$G_T = \frac{s^2 P_1 P_2 (\text{gain})}{(s+P_1)(s+P_2)} \quad (5)$$

Figure 6:
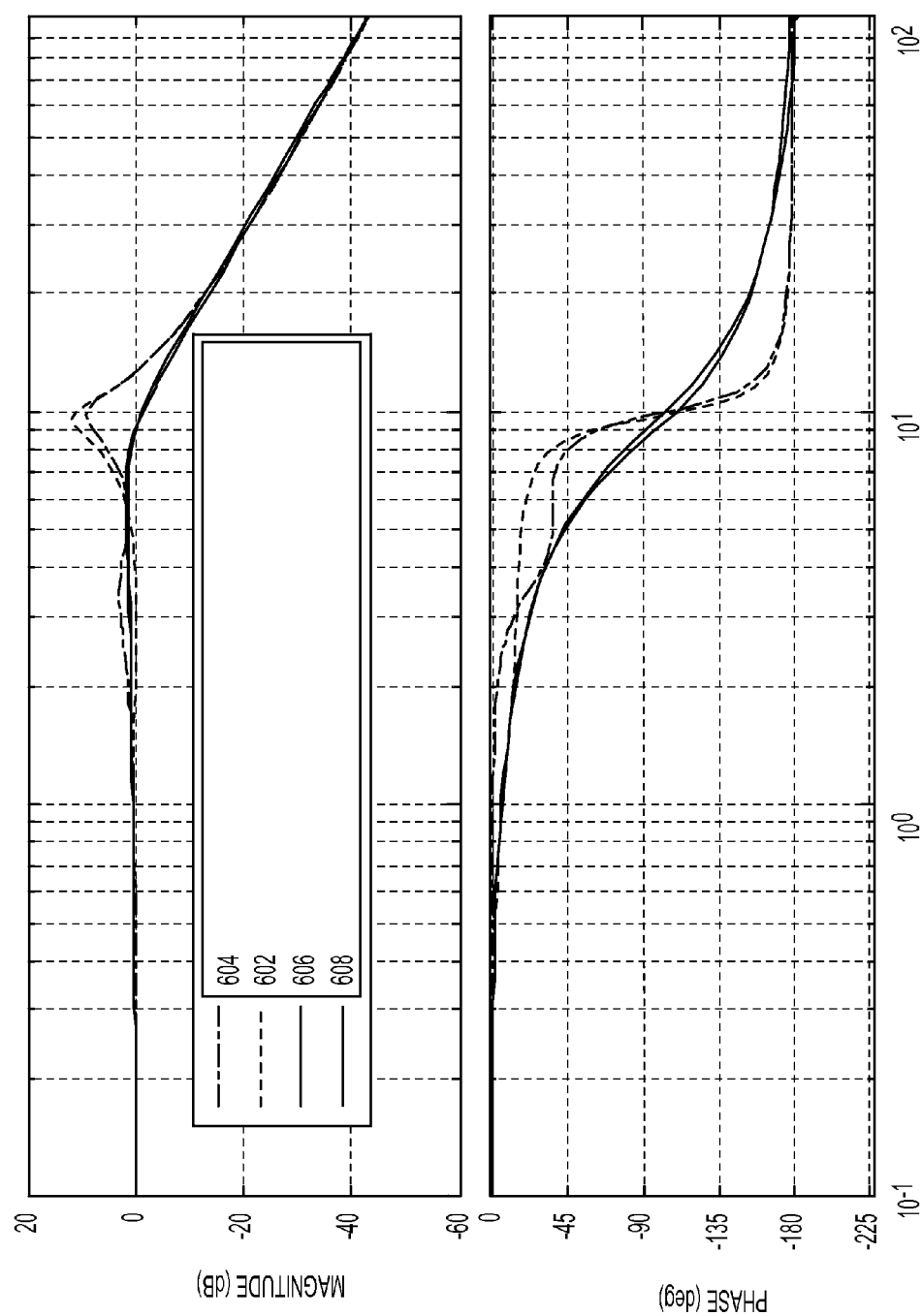
FIG. 6 is a bode plot illustrating a relationship between an input driver handwheel torque and the sensed handwheel torque for a variety of steering control system configurations.

FIG. 6 is a bode plot illustrating a relationship between an input driver handwheel torque ($T_{dr}$) and the sensed handwheel torque ($T_s$) for a variety of steering control system configurations. Frequency response 602 depicts magnitude and phase of $T_s/T_{dr}$ for a version of the steering system 12 in which the on-center torque adjustment compensation 118 of FIG. 2 is zero. As such, the magnitude of frequency response 602 rises well above a desired 0 dB level at higher frequencies, which may be attributable to inertia of the steering actuator motor 19 of FIG. 1 as well as torque and speed measurement dynamics and sampling effects. Frequency response 604 depicts magnitude and phase of $T_s/T_{dr}$ for a version of the steering system 12 in which the on-center torque adjustment compensation 118 of FIG. 2 only accounts for inertia of the steering actuator motor 19 of FIG. 1. Similar to the frequency response 602, the magnitude of frequency response 604 rises well above a desired 0 dB level at higher frequencies but not as high as frequency response 602. Frequency response 606 depicts magnitude and phase of $T_s/T_{dr}$ for a version of the steering system 12 in which the on-center torque adjustment compensation 118 of FIG. 2 accounts for the inertia of the steering actuator motor 19 of FIG. 1 as well as torque and speed measurement dynamics and sampling effects. The frequency response 606 uses the gain function 202, base transfer function 204, and corner frequencies 206 of FIG. 3 to limit the magnitude of frequency response 606 to a near 0 dB level and closely align to a model frequency response 608. The model frequency response 608 depicts magnitude and phase of $T_s/T_{dr}$ for a manual steering target that disengages its steering actuator for on-center conditions. Accordingly, the on-center torque compensator module 104 of FIGS. 2 and 3 provides improved on-center feel for an electric power steering system by closely aligning with a manual steering target over a desired range of frequencies.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for controlling an electric power steering system, the control system comprising:
    a first module configured to compute an on-center torque adjustment compensation based on a sensed handwheel torque, the on-center torque adjustment compensation configured to compensate for inertia of a steering actuator motor at a handwheel on-center condition using a frequency-based methodology, the on-center torque adjustment compensation models a difference between an input driver handwheel torque and the sensed handwheel torque for the handwheel on-center condition with the steering actuator motor engaged versus the steering actuator motor disengaged, wherein the on-center torque adjustment compensation further comprises a gain function and a base transfer function applied to the sensed handwheel torque, the base transfer function configured to implement a multi-order transfer function for a plurality of corner frequencies, the base transfer function comprises a product of the corner frequencies as an s-squared numerator term, where s is a complex frequency, and the base transfer function produces no on-center torque adjustment compensation at a zero frequency; and
    a second module configured to generate a command signal to control the steering actuator motor of the electric power steering system based on the on-center torque adjustment compensation.

2. The control system of claim 1, wherein the on-center torque adjustment compensation is further configured to compensate for torque measurement dynamics and sampling effects of the sensed handwheel torque.

3. The control system of claim 1, wherein the on-center torque adjustment compensation is further configured to compensate for torque measurement dynamics and sampling effects of a speed of the steering actuator motor.

4. The control system of claim 3, wherein the command signal to the steering actuator motor is further based on the speed of the steering actuator motor.

5. The control system of claim 1, further comprising a third module configured to determine an assist torque for handwheel off-center conditions, wherein the second module is further configured to generate the command signal based on a summation of the assist torque and the on-center torque adjustment compensation.

6. The control system of claim 1, wherein the base transfer function is characterized by an equation:

$$\frac{s^2 P_1 P_2}{(s+P_1)(s+P_2)},$$

where s is a complex frequency, and $P_1$ and $P_2$ define the corner frequencies.

7. The control system of claim 1, wherein the gain function is based on one or more of a vehicle speed and the sensed handwheel torque.

8. The control system of claim 1, wherein the on-center torque adjustment compensation approximates a frequency-based model of a transfer function representative of a motor model of the steering actuator motor, a mass plant model of the electric power steering system, torque measurement dynamics and sampling effects of the sensed handwheel torque, torque measurement dynamics and sampling effects of a speed of the steering actuator motor, and a delay time associated with the command signal.

9. A method for controlling an electric power steering system, the method comprising:
    computing an on-center torque adjustment compensation based on a sensed handwheel torque, the on-center torque adjustment compensation configured to compensate for inertia of a steering actuator motor at a handwheel on-center condition using a frequency-based methodology, the on-center torque adjustment compensation models a difference between an input driver handwheel torque and the sensed handwheel torque for the handwheel on-center condition with the steering actuator motor engaged versus the steering actuator motor disengaged, wherein the on-center torque adjustment compensation further comprises a gain function and a base transfer function applied to the sensed handwheel torque, the base transfer function configured to implement a multi-order transfer function for a plurality of corner frequencies, the base transfer function comprises a product of the corner frequencies as an s-squared numerator term, where s is a complex frequency, and the base transfer function produces no on-center torque adjustment compensation at a zero frequency; and generating a command signal to control the steering actuator motor of the electric power steering system based on the on-center torque adjustment compensation.

10. The method of claim 9, further comprising compensating for torque measurement dynamics and sampling effects of the sensed handwheel torque.

11. The method of claim 9, further comprising compensating for torque measurement dynamics and sampling effects of a speed of the steering actuator motor.

12. The method of claim 11, wherein the command signal to the steering actuator motor is further based on the speed of the steering actuator motor.

13. The method of claim 9, further comprising:
determining an assist torque for handwheel off-center conditions; and
generating the command signal based on a summation of the assist torque and the on-center torque adjustment compensation.

14. The method of claim 9, wherein the base transfer function is characterized by an equation:

$$\frac{s^2 P_1 P_2}{(s+P_1)(s+P_2)},$$

where s is a complex frequency, and $P_1$ and $P_2$ define the corner frequencies.

15. The method of claim 9, wherein the gain function is based on one or more of a vehicle speed and the sensed handwheel torque.

16. The method of claim 9, wherein the on-center torque adjustment compensation approximates a frequency-based model of a transfer function representative of a motor model of the steering actuator motor, a mass plant model of the electric power steering system, torque measurement dynamics and sampling effects of the sensed handwheel torque, torque measurement dynamics and sampling effects of a speed of the steering actuator motor, and a delay time associated with the command signal.

17. A control system for controlling an electric power steering system, the control system comprising:

a first module configured to compute an on-center torque adjustment compensation based on a sensed handwheel torque, the on-center torque adjustment compensation configured to compensate for inertia of a steering actuator motor at a handwheel on-center condition using a frequency-based methodology, the on-center torque adjustment compensation models a difference between an input driver handwheel torque and the sensed handwheel torque for the handwheel on-center condition with the steering actuator motor engaged versus the steering actuator motor disengaged, wherein the on-center torque adjustment compensation further comprises a gain function and a base transfer function applied to the sensed handwheel torque, the base transfer function configured to implement a multi-order transfer function for a plurality of corner frequencies, the base transfer function is characterized by an equation:

$$\frac{s^2 P_1 P_2}{(s+P_1)(s+P_2)},$$

where s is a complex frequency, and $P_1$ and $P_2$ define the corner frequencies; and a second module configured to generate a command signal to control the steering actuator motor of the electric power steering system based on the on-center torque adjustment compensation.

* * * * *